(12) United States Patent
Katou

(10) Patent No.: US 12,308,021 B2
(45) Date of Patent: May 20, 2025

(54) PUNCTUATION MARK DELETE MODEL TRAINING DEVICE, PUNCTUATION MARK DELETE MODEL, AND DETERMINATION DEVICE

(71) Applicant: NTT DOCOMO, INC., Chiyoda-ku (JP)

(72) Inventor: Taku Katou, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 140 days.

(21) Appl. No.: 17/995,529

(22) PCT Filed: Apr. 8, 2021

(86) PCT No.: PCT/JP2021/014931
§ 371 (c)(1),
(2) Date: Oct. 5, 2022

(87) PCT Pub. No.: WO2021/215262
PCT Pub. Date: Oct. 28, 2021

(65) Prior Publication Data
US 2023/0223017 A1    Jul. 13, 2023

(30) Foreign Application Priority Data

Apr. 20, 2020   (JP) ................. 2020-074788

(51) Int. Cl.
*G10L 15/18*    (2013.01)
*G06F 16/33*    (2025.01)
(Continued)

(52) U.S. Cl.
CPC .......... *G10L 15/1822* (2013.01); *G06F 16/33* (2019.01); *G06F 40/232* (2020.01);
(Continued)

(58) Field of Classification Search
CPC ..... G10L 15/1822; G10L 15/22; G10L 15/26; G10L 25/93; G06F 16/33; G06F 40/232
(Continued)

(56) References Cited

U.S. PATENT DOCUMENTS 11,138,519 B1 * 10/2021 Giri ................. G06N 20/00
11,250,452 B2 *  2/2022 Kulkarni ........... G06Q 30/0205
(Continued)

FOREIGN PATENT DOCUMENTS

CN        109887492 A  *  6/2019
CN        111062204 A  *  4/2020
(Continued)

OTHER PUBLICATIONS

International Search Report mailed on Jul. 13, 2021 in PCT/JP2021/014931 filed on Apr. 8, 2021, total 3 pages.
(Continued)

*Primary Examiner* — Edwin S Leland, III
(74) *Attorney, Agent, or Firm* — Oblon, McClelland, Maier & Neustadt, L.L.P.

(57) ABSTRACT

A punctuation mark delete model learning device is a device that generates, through machine learning, a punctuation mark delete model, and comprises a first learning data generation unit that generates first learning data consisting of a pair of an input sentence including a punctuation mark, a preceding sentence that is a sentence with the punctuation mark assigned at an end of the sentence, and a subsequent sentence following the punctuation mark, and a label indicating whether or not the assignment of the punctuation mark is correct, on the basis of a first text corpus consisting of text obtained by speech recognition processing, and a model learning unit that updates parameters of the punctuation mark delete model on the basis of an error between a probability obtained by inputting the input sentences of the
(Continued)

first learning data to the punctuation mark delete model and the label.

9 Claims, 17 Drawing Sheets

(51) Int. Cl.
    *G06F 40/232*      (2020.01)
    *G10L 15/22*      (2006.01)
    *G10L 15/26*      (2006.01)
    *G10L 25/93*      (2013.01)

(52) U.S. Cl.
    CPC ............. *G10L 15/22* (2013.01); *G10L 15/26* (2013.01); *G10L 25/93* (2013.01)

(58) Field of Classification Search
    USPC ............................................................ 704/6
    See application file for complete search history.

(56) References Cited

U.S. PATENT DOCUMENTS

| | | | | |
|---|---|---|---|---|
| 11,269,665 | B1 * | 3/2022 | Podgorny | G06N 20/00 |
| 2014/0297267 | A1 * | 10/2014 | Spencer | G06F 3/04886 |
| | | | | 704/9 |
| 2015/0262209 | A1 * | 9/2015 | Orsini | G06F 40/253 |
| | | | | 705/14.11 |
| 2015/0317069 | A1 * | 11/2015 | Clements | G06F 3/0237 |
| | | | | 715/773 |
| 2022/0019737 | A1 * | 1/2022 | Choi | G06N 20/00 |
| 2023/0072015 | A1 * | 3/2023 | Ihori | G06F 40/56 |
| 2023/0223017 | A1 * | 7/2023 | Katou | G06F 16/33 |
| | | | | 704/6 |

FOREIGN PATENT DOCUMENTS

| | | | | | |
|---|---|---|---|---|---|
| CN | 113326350 | A | * | 8/2021 | ......... G06F 16/3344 |
| CN | 113704396 | A | * | 11/2021 | |
| CN | 113609843 | B | * | 2/2022 | |
| CN | 115081455 | A | * | 9/2022 | ............ G06F 40/211 |
| JP | 2014-164575 | A | | 9/2014 | |
| KR | 101691327 | B1 | * | 12/2016 | |
| KR | 102705393 | B1 | * | 9/2024 | |
| WO | WO-2021215262 | A1 | * | 10/2021 | ......... G10L 15/1822 |

OTHER PUBLICATIONS

International Preliminary Report and Written Opinion issued Nov. 3, 2022 in PCT/JP2021/014931 (submitting English translation only), 5 pages.

* cited by examiner

Fig.4

| FIRST TEXT CORPUS | ただいま 紹介 いただき まし た 。 DDD で ござい ます 。 よろしく お願い いたし ます 。 本日 は 。 スケジュール です 。 |
|---|---|
| SECOND TEXT CORPUS | ただいま ご紹介 いただき まし た 。 DDD で ござい ます 。 よろしく お願い いたし ます 。 本日 の 。 スケジュール です 。 |

Fig.5

| INPUT SENTENCE | LABEL |
|---|---|
| ただいま 紹介 いただき まし た 。 DDD で ござい ます | FALSE |
| DDD で ござい ます 。 よろしく お願い し ます | TRUE |
| よろしく お願い し ます 。 本日 は | TRUE |
| 本日 は 。 スケジュール です | FALSE |

Fig.6

| FIRST TEXT CORPUS | thank you . for that kind introduction . I am glad . to see you . |
|---|---|
| SECOND TEXT CORPUS | thank you for the kind introduction . I am glad to see you . |

Fig. 7

| INPUT SENTENCE | LABEL |
|---|---|
| thank you . for that kind introduction | FALSE |
| for that kind introduction . I am glad | TRUE |
| I am glad . to see you | FALSE |

Fig. 8

| THIRD TEXT CORPUS | このショーは抽選です。2名分の予約をお願いしますか。 |
|---|---|
| FOURTH TEXT CORPUS | このショーは抽選です。2名分の予約。をお願いしますか。 |

Fig.9

| INPUT SENTENCE | LABEL |
|---|---|
| このショーは抽選です。がいかがいたしますか | FALSE |
| がいかがいたしますか。2名分の予約 | TRUE |
| 2名分の予約。をお願いします。 | FALSE |

*Fig.10*

| THIRD TEXT CORPUS | you need to share this table with other guests . what would you like to order . |
|---|---|
| FOURTH TEXT CORPUS | you need to share this . table with other guests . what would you . like to order . |

Fig. 11

| INPUT SENTENCE | LABEL |
|---|---|
| you need to share this . table with other guests | FALSE |
| table with other guests . what would you | TRUE |
| what would you . like to order | FALSE |

(a)

(b)

_PUNCTUATION MARK DELETE MODEL TRAINING DEVICE, PUNCTUATION MARK DELETE MODEL, AND DETERMINATION DEVICE_

TECHNICAL FIELD

The present invention relates to a punctuation mark delete model learning device, a punctuation mark delete model, and a determination device.

BACKGROUND ART

It is required to appropriately assign punctuation marks to text obtained as a result of speech recognition in order to improve readability and translatability. On the other hand, a technology for dividing an input sentence by a division candidate point recognized on the basis of a pattern of arrangement of phrases and a pattern of dependency between the phrases is known (for example, see Patent Literature 1).

CITATION LIST

Patent Literature

[Patent Literature 1] Japanese Unexamined Patent Publication No. 2014-164575

SUMMARY OF INVENTION

Technical Problem

Text obtained from a speech recognition result often contains errors, and a punctuation mark is sometimes assigned to an incorrect place due to this recognition error. Further, when an input sentence is divided on the basis of only an input sentence converted into text and a punctuation mark is assigned at an end of a sentence division as in the technology described in the above patent literature, the accuracy of punctuation mark assignment may be low because voice information corresponding to the input sentence is not referred to.

Therefore, the present invention has been made in view of the above problems, and an object of the present invention is to appropriately assign a punctuation mark to text obtained by speech recognition processing.

Solution to Problem

In order to solve the above problem, a punctuation mark delete model learning device according to an embodiment of the present invention is a punctuation mark delete model learning device for generating, through machine learning, a punctuation mark delete model for determining whether or not a punctuation mark assigned to text obtained by speech recognition processing is correct, wherein the punctuation mark delete model receives two consecutive sentences of a first sentence with a punctuation mark assigned at an end of the sentence and a second sentence following the first sentence, and outputs a probability indicating whether the punctuation mark assigned at an end of the first sentence is correct, and the punctuation mark delete model learning device comprises a first learning data generation unit configured to generate first learning data consisting of a pair of an input sentence including a preceding sentence, the preceding sentence being a sentence with a punctuation mark assigned at an end of the sentence, and a subsequent sentence, the subsequent sentence being a sentence following the punctuation mark in text constituting the first text corpus, and a label indicating whether or not the assignment of the punctuation mark is correct on the basis of a first text corpus, the first text corpus being text including of one or more sentences obtained by speech recognition processing and having a punctuation mark assigned thereto on the basis of information obtained by speech recognition processing; and a model learning unit configured to update parameters of the punctuation mark delete model on the basis of an error between the probability obtained by inputting the input sentences of the first learning data to the punctuation mark delete model and the label associated with the input sentence.

According to the above embodiment, because the two sentences consisting of the preceding sentence immediately before the punctuation mark inserted on the basis of the information obtained by the speech recognition processing and the subsequent sentence immediately after the punctuation mark are used as the input sentences in the first learning data, and learning of the punctuation mark delete model is performed, information obtained from a voice is reflected in the punctuation mark delete model. Further, because in the first learning data, the label indicating whether or not the punctuation mark included in the input sentence is corrected is associated with each input sentence, and learning of the punctuation mark delete model is performed on the basis of the error between the probability obtained by inputting the input sentence to the punctuation mark delete model and the label, information on the punctuation mark assigned without error is reflected in the punctuation mark delete model. Therefore, it becomes possible to obtain a punctuation mark delete model capable of correctly deleting a punctuation mark erroneously assigned in the text obtained by the speech recognition processing.

Advantageous Effects of Invention

A punctuation mark delete model learning device, a punctuation mark delete model, and a determination device capable of appropriately assigning a punctuation mark to text obtained by speech recognition processing are realized.

BRIEF DESCRIPTION OF DRAWINGS

FIG. 4 is a diagram illustrating an example of a first text corpus and a second text corpus.

FIG. 5 is a diagram illustrating an example of first learning data generated on the basis of the first text corpus and the second text corpus illustrated in FIG. 4.

FIG. 6 is a diagram illustrating an example of the first text corpus and the second text corpus in English.

FIG. 7 is a diagram illustrating an example of first learning data in English generated on the basis of the first text corpus and the second text corpus illustrated in FIG. 6.

FIG. 8 is a diagram illustrating an example of a third text corpus and a fourth text corpus.

FIG. 9 is a diagram illustrating an example of second learning data generated on the basis of the third text corpus and the fourth text corpus illustrated in FIG. 8.

FIG. 10 is a diagram illustrating an example of a third text corpus and a fourth text corpus in English.

FIG. 11 is a diagram illustrating an example of second learning data in English generated on the basis of the third text corpus and the fourth text corpus illustrated in FIG. 10.

FIG. 17(*b*) is a diagram illustrating a configuration of the determination program.

DESCRIPTION OF EMBODIMENTS

An embodiment of a punctuation mark delete model learning device, a determination device, and a punctuation mark delete model according to the present invention will be described with reference to the drawings. The same parts are denoted by the same reference signs and duplicate description thereof will be omitted, if possible.

The punctuation mark delete model learning device of the present embodiment is a device that generates, through machine learning, a punctuation mark delete model for determining whether or not a punctuation mark assigned to text obtained by speech recognition processing is correct. The punctuation mark delete model of the present embodiment determines whether or not each punctuation mark is correct in the text including the punctuation mark obtained by the speech recognition processing. Specifically, the punctuation mark delete model is a model constructed by machine learning for receiving two consecutive sentences including a first sentence with a punctuation mark assigned at an end of the sentence and a second sentence following the first sentence, and outputting a probability indicating whether or not the punctuation mark assigned at an end of the first sentence is correct.

The determination device of the present embodiment is a device that determines whether or not a punctuation mark assigned to a determination target text obtained by speech recognition processing is correct, deletes the punctuation mark determined to be incorrect from the determination target text, and outputs the determination target text with a corrected punctuation mark.

Figure 1:
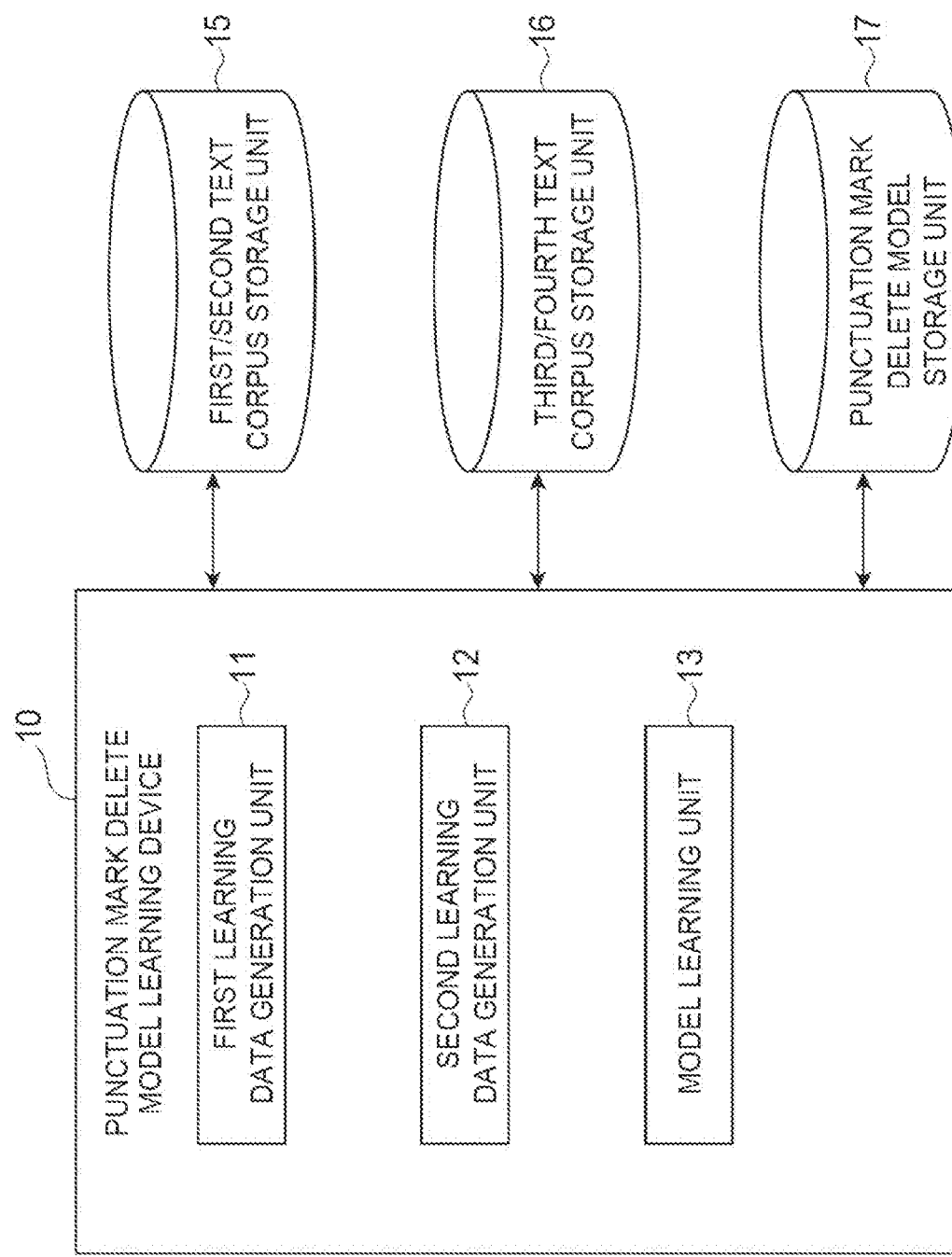
FIG. 1 is a block diagram illustrating a functional configuration of a punctuation mark delete model learning device of the present embodiment.

FIG. 1 is a diagram illustrating a functional configuration of a punctuation mark delete model learning device according to the present embodiment. As illustrated in FIG. 1, the punctuation mark delete model learning device 10 functionally comprises a first learning data generation unit 11, a second learning data generation unit 12, and a model learning unit 13. Each of these functional units 11 to 13 may be configured in one device or may be configured to be distributed in a plurality of devices.

Further, the punctuation mark delete model learning device 10 is configured to be accessible to storage means such as a first/second text corpus storage unit 15, a third/fourth text corpus storage unit 16, and a punctuation mark delete model storage unit 17. The first/second text corpus storage unit 15, the third/fourth text corpus storage unit 16, and the punctuation mark delete model storage unit 17 may be configured in the punctuation mark delete model learning device 10, and may be configured as other devices outside the punctuation mark delete model learning device 10, as illustrated in FIG. 1.

Figure 2:
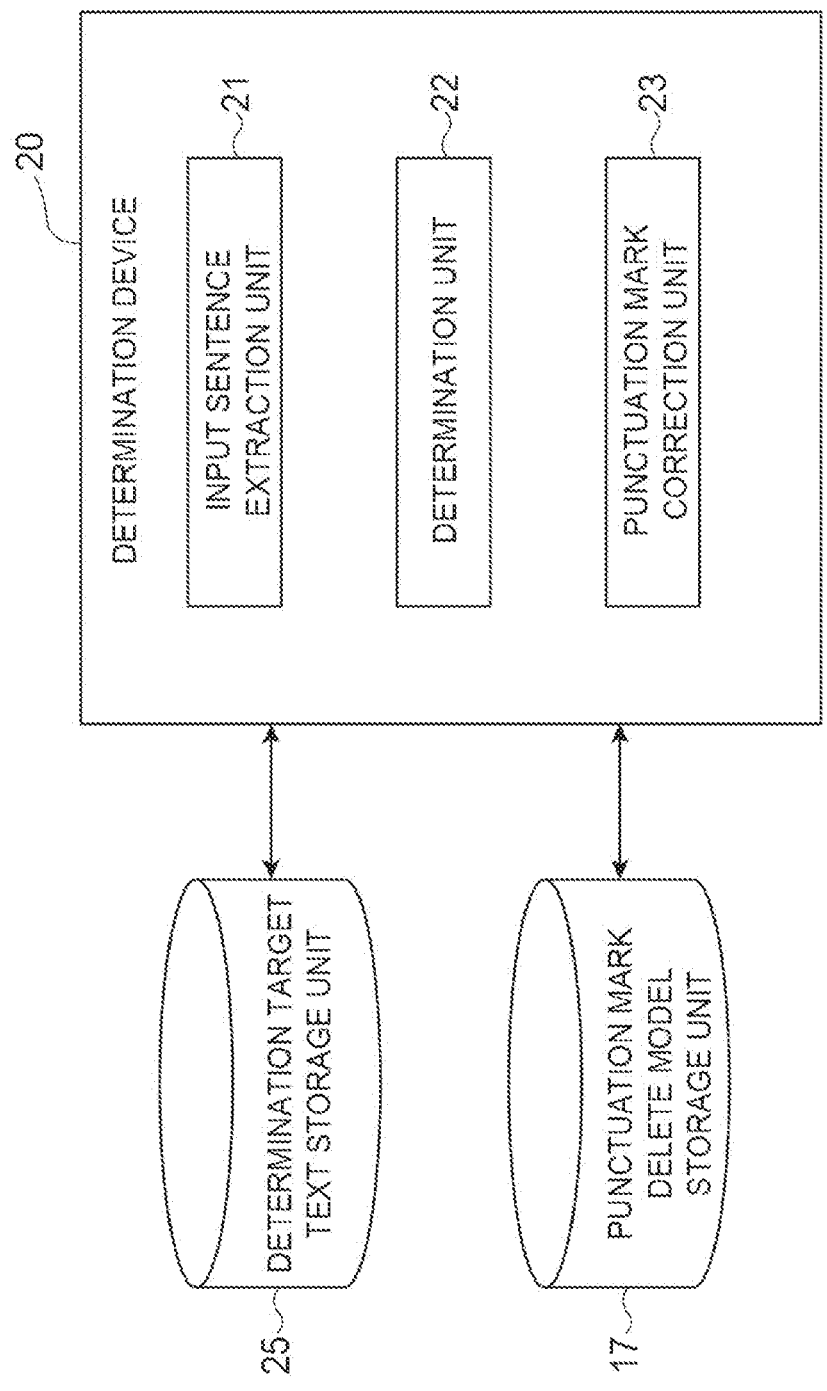
FIG. 2 is a block diagram illustrating a functional configuration of a determination device of the present embodiment.

FIG. 2 is a diagram illustrating a functional configuration of a determination device according to the embodiment. As illustrated in FIG. 2, the determination device 20 functionally comprises an input sentence extraction unit 21, a determination unit 22, and a punctuation mark correction unit 23. Each of these functional units 21 to 23 may be configured in one device or may be configured to be distributed in a plurality of devices.

Further, the determination device 20 is configured to be accessible to a determination target text storage unit 25 and the punctuation mark delete model storage unit 17. The determination target text storage unit 25 and the punctuation mark delete model storage unit 17 may be configured in the determination device 20 or may be configured in another external device.

Further, in the present embodiment, an example in which the punctuation mark delete model learning device 10 and the determination device 20 are configured in different devices (computers) is shown, but these may be configured integrally.

The block diagrams illustrated in FIGS. 1 and 2 show blocks on the function basis. These functional blocks (components) are realized by any combination of at least one of hardware and software. Further, a method of realizing the respective functional blocks is not particularly limited. That is, each functional block may be realized using one physically or logically coupled device, or may be realized by connecting two or more physically or logically separated devices directly or indirectly (for example, using a wired scheme, a wireless scheme, or the like) and using such a plurality of devices. The functional block may be realized by combining the one device or the plurality of devices with software.

The functions include judging, deciding, determining, calculating, computing, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, or the like, but the present disclosure is not limited thereto. For example, a functional block (constituent unit) that allows a transmitting function is called a transmitting unit or a transmitter. In each case, a realization method is not particularly limited as described above.

Figure 3:
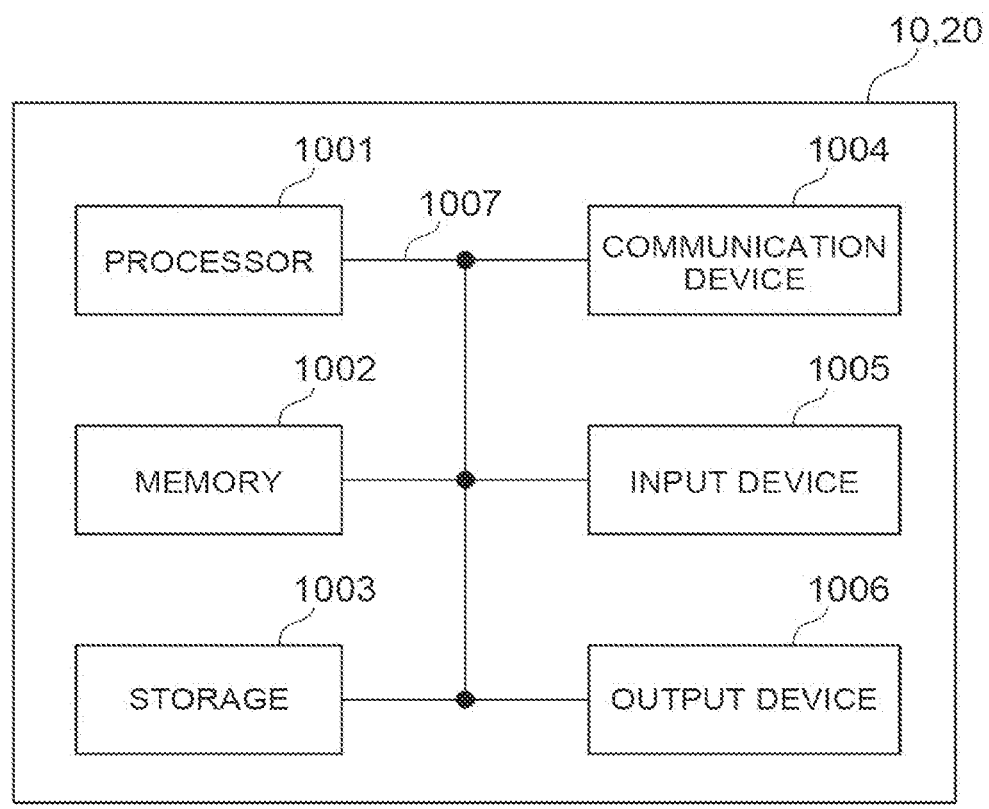
FIG. 3 is a hard block diagram of the punctuation mark delete model learning device and the determination device.

For example, the punctuation mark delete model learning device 10 and the determination device 20 in the embodiment of the present disclosure may function as a computer. FIG. 3 is a diagram illustrating an example of a hardware configuration of the punctuation mark delete model learning device 10 and the determination device 20 according to the embodiment. The punctuation mark delete model learning device 10 and the determination device 20 may be physically configured as a computer device including a processor 1001, a memory 1002, a storage 1003, a communication device 1004, an input device 1005, an output device 1006, a bus 1007, and the like.

In the following description, the term "device" can be read as a circuit, a device, a unit, or the like. A hardware configuration of the punctuation mark delete model learning device 10 and the determination device 20 may be configured to include one or a plurality of devices illustrated in FIG. 3, or may be configured not to include some of the devices.

Respective functions in the punctuation mark delete model learning device 10 and the determination device 20 are realized by loading predetermined software (a program) into hardware such as the processor 1001 or the memory 1002 so that the processor 1001 performs calculation to control communication that is performed by the communication device 1004 or control reading and/or writing of data in the memory 1002 and the storage 1003.

The processor 1001 operates, for example, an operating system to control the entire computer. The processor 1001 may be configured of a central processing unit (CPU) including an interface with peripheral devices, a control device, an arithmetic unit, a register, and the like. For example, the respective functional units 11 to 13, 21 to 23, and the like illustrated in FIGS. 1 and 2 may be realized by the processor 1001.

Further, the processor 1001 reads a program (program code), a software module, and data from the storage 1003 and/or the communication device 1004 into the memory 1002, and executes various processing according to these. As the program, a program that causes a computer to execute at least some of operations described in the above-described embodiment may be used. For example, the functional units 11 to 13 and 21 to 23 of the punctuation mark delete model learning device 10 and the determination device 20 may be realized by a control program stored in the memory 1002 and operated by the processor 1001. Although a case in which the various processing described above are executed by one processor 1001 has been described, the processing may be executed simultaneously or sequentially by two or more processors 1001. The processor 1001 may be mounted on one or more chips. The program may be transmitted from a network via a telecommunication line.

The memory 1002 is a computer-readable recording medium, and may be configured of, for example, at least one of a read only memory (ROM), an erasable programmable ROM (EPROM), an electrically erasable programmable ROM (EEPROM), and a random access memory (RAM). The memory 1002 may also be referred to as a register, a cache, a main memory (main storage device), or the like. The memory 1002 can store a program (program code), a software module, or the like that can be executed to implement the punctuation mark delete model learning method and the determination method according to an embodiment of the present invention.

The storage 1003 is a computer-readable recording medium and may be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including the memory 1002 and/or the storage 1003, a server, or another appropriate medium.

The communication device 1004 is hardware (a transmission/reception device) for performing communication between a computer via a wired and/or wireless network, and is also referred to as, for example, a network device, a network controller, a network card, or a communication module.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, each device such as the processor 1001 or the memory 1002 is connected by the bus 1007 for communicating information. The bus 1007 may be configured of a single bus or may be configured of different buses between devices.

Further, the punctuation mark delete model learning device 10 and the determination device 20 may include hardware such as a microprocessor, a digital signal processor (DSP), an application specific integrated circuit (ASIC), a programmable logic device (PLD), and a field programmable gate array (FPGA), and some or all of respective functional blocks may be realized by the hardware. For example, the processor 1001 may be implemented using at least one of these pieces of hardware.

Next, each functional unit of the punctuation mark delete model learning device 10 will be described. The first learning data generation unit 11 generates first learning data on the basis of the first text corpus. The first text corpus is a text containing one or more sentences obtained by speech recognition processing.

A punctuation mark is assigned to the first text corpus on the basis of the information obtained by the speech recognition processing. A scheme used for the assignment of the punctuation mark is not limited, but for example, the first text corpus may be a text in which a punctuation mark is inserted at an end of each voice section separated by a silent section having a predetermined length or longer. Further, the first text corpus may be a text obtained by speech recognition processing using a known language model in which a punctuation mark is treated as one word.

Specifically, the first learning data generation unit 11 generates the first learning data consisting of a pair of an input sentence including a preceding sentence, the preceding sentence being a sentence with a punctuation mark assigned at an end of the sentence, and a subsequent sentence, the subsequent sentence being a sentence following the punctuation mark in the text constituting the first text corpus, and a label indicating whether or not the assignment of the punctuation mark is correct.

The first learning data generation unit 11 may reference the second text corpus for assignment a label indicating whether or not the assignment of the punctuation mark in the input sentence is correct. The second text corpus is text that consists of the same text as the first text corpus and has a punctuation mark assigned to an end of each sentence included in the text.

The first learning data generation unit 11 may acquire the first text corpus and the second text corpus from the first/second text corpus storage unit 15. The first/second text corpus storage unit 15 is a storage means that stores the first text corpus and the second text corpus.

FIG. 4 is a diagram illustrating an example of the first text corpus and the second text corpus corresponding thereto stored in the first/second text corpus storage unit 15. As illustrated in FIG. 4, the first learning data generation unit 11 acquires the first text corpus " ただいま 紹介 いただきまし た 。DDD で ございます 。よろしくお願い し ます 。 本日 は 。スケジュール です 。" obtained by speech recognition processing. In the first text corpus illustrated in FIG. 4, punctuation marks are assigned to silent sections detected in the speech recognition processing. Further, the first text corpus includes text " 本日 は" that is a misrecognition of voice " 本日 の".

Further, the first learning data generation unit 11 acquires the second text corpus " ただいま ご 紹介いただき まし たDDD で ございます 。よろしく お願い し ます 。 本日 の スケジュール です 。" The second text corpus is text with correctly assigned punctuation marks, such as manually input and generated text.

The first learning data generation unit 11 extracts punctuation marks from the first text corpus, further extracts a preceding sentence that is a sentence immediately before the punctuation mark and a subsequent sentence that is a sentence following the punctuation mark, and uses the sentences as input sentences. The first learning data generation unit 11 references a part of the text in the second text corpus corresponding to the input sentence extracted from the first text corpus, associates the input sentence with a label indicating that the punctuation mark assigned in the input sentence is correct when a punctuation mark is assigned in the referenced text, and associates the input sentence with a label indicating that the punctuation mark assigned in the input sentence is incorrect when the punctuation mark is not assigned in the referenced text.

When the second text corpus is referenced, the first learning data generation unit 11 may perform association (alignment) between the first text corpus and the second text corpus character by character or word by word using a known algorithm, and an algorithm called DP matching may be adopted.

FIG. 5 is a diagram illustrating an example of the first learning data generated on the basis of the first text corpus and the second text corpus illustrated in FIG. 4. The first learning data generation unit 11 extracts an input sentence consisting of a preceding sentence " ただいま紹介 いただきまし た", a punctuation mark, and a subsequent sentence "D D D で ござい ます" from the first text corpus. Because a punctuation mark is not assigned to a part 「ただいま ご 紹介 いただき まし たDDD で ございます」of the text in the second text corpus corresponding to the extracted input sentence, the first learning data generation unit 11 associates the input sentence with a label "FALSE" indicating that the assigned punctuation mark is incorrect to generate one piece of first learning data.

Further, the first learning data generation unit 11 extracts an input sentence consisting of a preceding sentence "D D D で ござい ます", a punctuation mark, and a subsequent sentence " よろしく お願い します" from the first text corpus. Because the punctuation mark is assigned to a part "D D D で ございます 。よろしく し ます" of the text in the second text corpus corresponding to the extracted input sentence, the first learning data generation unit 11 associates the input sentence with a label "TRUE" indicating that the assigned punctuation mark is correct to generate one piece of first learning data.

Similarly, the first learning data generation unit 11 generates the first learning data in which a flag "TRUE" is associated with the input sentence " よろしく お願い し ます本日 は" and the first learning data in which a flag "FALSE" is associated with the input sentence " 本日 は 。スケジュール です 。".

FIG. 6 is a diagram illustrating an example of a first text corpus and a second text corpus corresponding thereto in English. As illustrated in FIG. 6, the first learning data generation unit 11 acquires the first text corpus "thank you. for that kind introduction . I am glad . to see you." obtained by speech recognition processing. In the first text corpus illustrated in FIG. 6, a period (a punctuation mark) is assigned to a silent section detected in the speech recognition processing. Further, the first text corpus includes text "that" that is a misrecognition of voice "the".

Further, the first learning data generation unit 11 acquires a second text corpus "thank you for the kind introduction. I am glad to see you.". The second text corpus is text with a correctly assigned period (punctuation mark), such as manually input and generated text.

The first learning data generation unit 11 extracts the period from the first text corpus, further extracts a preceding sentence that is a sentence immediately before the period and a subsequent sentence that is a sentence immediately after the period, and uses the sentences as input sentences. The first learning data generation unit 11 references a part of the text in the second text corpus corresponding to the input sentence extracted from the first text corpus, associates the input sentence with a label indicating that the period assigned to the input sentence is correct when the period is assigned to the referred text, and associates the input sentence with a label indicating that the period assigned to the input sentence is incorrect when the period is not assigned to the referenced text.

FIG. 7 is a diagram illustrating an example of the first learning data in English generated on the basis of the first text corpus and the second text corpus illustrated in FIG. 6. The first learning data generation unit 11 extracts an input sentence consisting of a preceding sentence "thank you", a period, and a subsequent sentence "for that kind introduction" from the first text corpus. Because, a period is not assigned to a part "thank you for the kin introduction" of the text in in the second text corpus corresponding to the extracted input sentence, the first learning data generation unit 11 associates the input sentence with the label "FALSE" indicating that the assigned period is incorrect to generate one piece of first learning data.

Further, the first learning data generation unit 11 extracts an input sentence consisting of a preceding sentence "for that kind introduction", a period, and a subsequent sentence "I am glad" from the first text corpus. Because a period is assigned to a part "for the kin introduction. I am glad" of the text in the second text corpus corresponding to the extracted input sentence, the first learning data generation unit 11 associates the input sentence with the label "TRUE" indicating that the assigned period is correct to generate one piece of first learning data.

Similarly, the first learning data generation unit 11 generates the first learning data in which the flag "FALSE" is associated with the input sentence "I am glad . to see you".

The second learning data generation unit 12 generates second learning data on the basis of the third text corpus and the fourth text corpus. The second learning data generation unit 12 may acquire the third text corpus and the fourth text corpus from the third/fourth text corpus storage unit 16.

The third text corpus consists of text including a sentence with a punctuation mark has been legitimately assigned at the end of the sentence. The third text corpus may be generated in advance and stored in the third/fourth text corpus storage unit 16, for example. Further, text collected from a web on the Internet may be stored in the third/fourth text corpus storage unit 16 as the third text corpus in advance.

The fourth text corpus consists of text in which punctuation marks are randomly inserted into text constituting the third text corpus. The fourth text corpus may be generated on the basis of each third text corpus in advance and stored in the third/fourth text corpus storage unit 16.

Specifically, the second learning data generation unit 12 generates the second learning data consisting of a pair of an input sentence including a preceding sentence, the preceding sentence being a sentence with a punctuation mark assigned at an end of the sentence, and a subsequent sentence, the subsequent sentence being a sentence following the punctuation mark in the text constituting the fourth text corpus, and a label indicating whether or not the assignment of the punctuation mark is correct.

FIG. 8 is a diagram illustrating an example of the third text corpus and the fourth text corpus corresponding thereto stored in the third/fourth text corpus storage unit 16. As illustrated in FIG. 8, the second learning data generation unit 12 acquires a third text corpus " このショー は 抽選 です が いか が いたし ます か ? 名分 の 予約 を お願い し ます。" The third text corpus illustrated in FIG. 8 consists of two sentences to which a punctuation mark has been legitimately assigned.

Further, the second learning data generation unit 12 acquires the fourth text corpus " このショー は 抽選 です 。が いか が いた しますか ? 名分 の 予約 。を お願い し ます 。" The fourth text corpus illustrated in FIG. 8 is a text with punctuation marks randomly assigned between words of the third text corpus corresponding thereto, and punctuation marks are assigned to four places.

The second learning data generation unit 12 extracts the punctuation mark from the fourth text corpus, and further extracts the preceding sentence that is a sentence immediately before the punctuation mark and the subsequent sentence that is a sentence following the punctuation mark, and uses the sentences as input sentences. The second learning data generation unit 12 references a part of text in the third text corpus corresponding to the input sentence extracted from the fourth text corpus, associates the input sentence with a label indicating that the punctuation mark assigned in the input sentence is correct when a punctuation mark is assigned in the referenced text, and associates the input sentence with a label indicating that the punctuation mark assigned in the input sentence is incorrect when the punctuation mark is not assigned in the referenced text.

When the third text corpus is referenced, the second learning data generation unit 12 may perform association (alignment) between the fourth text corpus with the third text corpus character by character or word by word using a known algorithm, and an algorithm called DP matching may be adopted.

FIG. 9 is a diagram illustrating an example of the second learning data generated on the basis of the third text corpus and the fourth text corpus illustrated in FIG. 8. The second learning data generation unit 12 extracts an input sentence consisting of a preceding sentence " このショー は 抽選 です", a punctuation mark, and a subsequent sentence " が いか が いたし ます か" from the fourth text corpus. Because a punctuation mark is not assigned to a part " この ショー は 抽選 です が いか が いたし ます か" of the text in the third text corpus corresponding to the extracted input sentence, the second learning data generation unit 12 generates one piece of second learning data by associating the input sentence with the label "FALSE" indicating that the assigned punctuation mark is incorrect.

Further, the second learning data generation unit 12 extracts an input sentence consisting of a preceding sentence " が いか が いたします か", a punctuation mark, and a subsequent sentence " 名分 の 予約" from the fourth text corpus. Because the punctuation mar is assigned to a part " が いか が いたします か ? 名分 の 予約" of the text in the third text corpus corresponding to the extracted input sentence, the second learning data generation unit 12 associates the input sentence with the label "TRUE" indicating that the assigned punctuation mark is correct to generate one piece of second learning data.

Similarly, the second learning data generation unit 12 generates the second learning data in which the flag "FALSE" is associated with an input sentence "2 名分 の 予約 。を お願い し ます".

FIG. 10 is a diagram illustrating an example of a third text corpus and a fourth text corpus corresponding thereto in English stored in the third/fourth text corpus storage unit 16. As illustrated in FIG. 10, the second learning data generation unit 12 acquires a third text corpus, "you need to share this table with other guests. what would you like to order." The third text corpus illustrated in FIG. 10 consists of two sentences, each with a legitimately assigned period (a punctuation mark).

Further, the second learning data generation unit 12 acquires a fourth text corpus, "you need to share this. table with other guests. what would you. like to order." The fourth text corpus illustrated in FIG. 10 is text with periods (punctuation marks) randomly assigned between words of the third text corpus corresponding to the fourth text corpus, and periods are assigned at four places.

The second learning data generation unit 12 extracts the period from the fourth text corpus, further extracts a preceding sentence that is a sentence immediately before the period and a subsequent sentence that is a sentence immediately after the period, and uses the sentences as input sentences. The second learning data generation unit 12 references a part of the text in the third text corpus corresponding to the input sentence extracted from the fourth text corpus, associates the input sentence with a label indicating that the period assigned to the input sentence is correct when the period is assigned to the referred text, and associates the input sentence with a label indicating that the period assigned to the input sentence is incorrect when the period is not assigned to the referenced text.

FIG. 11 is a diagram illustrating an example of the second learning data generated on the basis of the third text corpus and the fourth text corpus illustrated in FIG. 10. The second learning data generation unit 12 extracts an input sentence consisting of a preceding sentence "you need to share this", a period, and a subsequent sentence "table with other guests" from the fourth text corpus. Because a period is not assigned to a part "you need to share this table with other guests" of the text in the third text corpus corresponding to the extracted input sentence, the second learning data generation unit 12 associates the input sentence with the label "FALSE" indicating that the assigned period is incorrect to generate one piece of second learning data.

Further, the second learning data generation unit 12 extracts an input sentence consisting of a preceding sentence "table with other guests", a period, and a subsequent sentence "what would you" from the fourth text corpus. Because a period is assigned to a part "table with other guests. what would you" of the text in the third text corpus corresponding to the extracted input sentence, the second learning data generation unit 12 associates the input sentence with the label "TRUE" indicating that the assigned period is correct to generate one piece of second learning data.

Similarly, the second learning data generation unit 12 generates the second learning data in which the flag "FALSE" is associated with the input sentence "what would you . like to order".

For the generation of the first learning data, text having an appropriately assigned punctuation mark, which corresponds to the first text corpus, is required in order to associate the input sentence with an appropriate label, and the second text corpus, for example, is applied to this text. Because the second text corpus is, for example, manually input and generated text, it takes time and effort to obtain a large number of second text corpuses. Because the second learning data can be used for learning of the punctuation mark delete model together with the first learning data by generating the second learning data as described above, it becomes possible to supplement the amount of learning data to be used for model generation, and as a result, it is possible to obtain a highly accurate punctuation mark delete model.

With reference to FIG. 1 again, the model learning unit 13 performs machine learning for updating parameters of the punctuation mark delete model on the basis of an error between a probability obtained by inputting the input sentence of the first learning data and the label associated with the input sentence.

When the second learning data is generated by the second learning data generation unit 12, the model learning unit 13 may use the second learning data in addition to the first learning data for learning of the punctuation mark delete model.

As described above, the punctuation mark delete model may be any model as long as the model takes an input sentence consisting of a preceding sentence, a punctuation mark, and a subsequent sentence as an input and outputs a probability indicating whether the assigned punctuation mark is correct, and may be constructed, for example, as a model including a well-known neural network.

Further, the punctuation mark delete model may be configured by a recurrent neural network. The recurrent neural network is a neural network configured to update a current hidden state vector using a hidden state vector at a previous time and an input vector at a current time. An output obtained by sequentially inputting word strings constituting the input sentence along a time step is compared with the label, and learning is performed so that an error therebetween becomes small.

Further, in the present embodiment, the punctuation mark delete model may be constructed by a long short-term memory network (LSTM: Long Short-Term Memory). The long-term memory network is a kind of recurrent neural network, and is a model capable of learning a long-term dependence relationship of time-series data. In the long short-term memory network, the word string of the input sentence is input to the LSTM block one word at a time in chronological order, thereby making it possible to continuously store all the words input so far and then calculate the output.

Further, in the present embodiment, the punctuation mark delete model may be configured by a bidirectional long short-term storage network (BLSTM: Bidirectional Long Short-Tenn Memory) that is a long short-term storage network using information in a backward direction in addition to using information in a forward direction of the word string.

Figure 12:
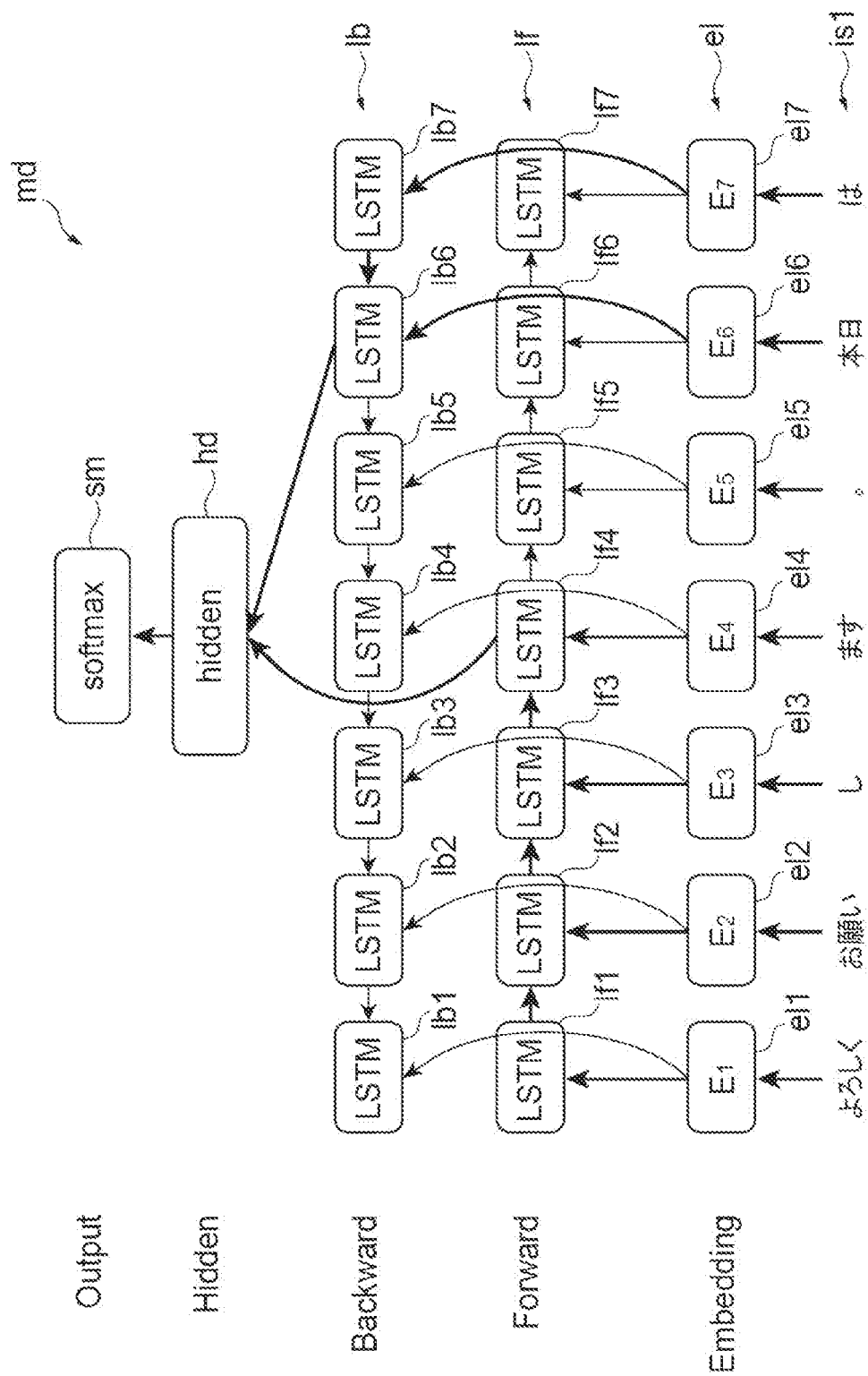
FIG. 12 is a diagram illustrating an example of learning of a punctuation mark delete model configured of a bidirectional long short-term storage network.

FIG. 12 is a diagram illustrating an example of learning of a punctuation mark delete model configured by the bidirectional long short-term storage network of the present embodiment. As illustrated in FIG. 12, a punctuation mark delete model md includes an embedded layer el, a forward layer 1f configured of a long short-term storage network for inputting a word string of an input sentence in a forward direction, a backward layer 1b configured by a long short-term storage network for inputting the word string of the input sentence in the backward direction, a hidden layer hd, and an output layer sm. In the example illustrated in FIG. 12, an input sentence is 1 " よろしく お願い し ます 。本日 は" is input to the punctuation mark delete model md.

First, the model learning unit 13 converts each word of the input sentence is1 into a word vector expression in the embedded layer el, and obtains word vectors el1 to el7. Here, a method of converting a word into a vector may be, for example, a known algorithm such as word2vec or glove.

The model learning unit 13 inputs each word in the word string of the input sentence converted into a vector to each of the LSTM block 1f(n) of the forward layer 1f (n is an integer equal to or greater than 1 and corresponds to the number of words in the input sentence) and the LSTM block 1b(n) of the backward layer 1b. In the example illustrated in FIG. 12, the forward layer 1f is shown as LSTM blocks 1f1 to 1f7 developed in a forward direction in time series. Further, the backward layer 1b is shown as LSTM blocks 1b7 to 1b1 developed in a backward direction in time series.

The model learning unit 13 inputs the word vector el1 to the LSTM block 1f1 of the forward layer 1f. Then, the model learning unit 13 inputs a word vector el2 and an output of the LSTM block 1f1 to the LSTM block 1f2. The model learning unit 13 inputs an output of the LSTM block 1f(n−1) at a previous time and the word vector el(n) at a current time to the LSTM block 1f(n) at the current time to acquire an output of the LSTM block 1f(n).

Further, the model learning unit 13 inputs a word vector el7 to the LSTM block 1b7 of the backward layer 1b. Then, the model learning unit 13 inputs the word vector el6 and the output of the LSTM block 1b7 to the LSTM block 1b6. The model learning unit 13 inputs an output of the LSTM block 1b(n+1) at the previous time and the word vector el(n) at the current time to the LSTM block 1b(n) at the current time to acquire an output of the LSTM block 1b(n).

The model learning unit 13 combines an output obtained by inputting the word string of the input sentence to the forward layer 1f according to the arrangement order with an output obtained by inputting the word string of the input sentence to the backward layer 1b in an order reverse to the arrangement order to output the hidden layer hd. When the outputs of the LSTM block 1f(n) and the LSTM block 1b(n) are n-dimensional vectors, the output of the hidden layer hd is a 2n-dimensional vector as shown below.

Output of forward layer 1f: [$f_1, f_2, \ldots, f_n$]

Output of backward layer 1b: [$b_1, b_2, \ldots, b_n$]

=>Output of the hidden layer hd: [$f_1, f_2, \ldots, f_n, b_1, b_2, \ldots, b_n$]

The model learning unit 13 may input a word string from a beginning of the preceding sentence to an end of the preceding sentence to the long short-term storage network in the forward direction according to the arrangement order in the input sentence, and input a word string from an end of the subsequent sentence to a beginning of the subsequent sentence to the long short-term storage network in the backward direction according to an order reverse to the arrangement order in the input sentence.

That is, in the example illustrated in FIG. 12, the model learning unit 13 sequentially inputs the word vectors el1 to el4 from the beginning to the end of the preceding sentence " よろしく お願い し ます" of the input sentence is 1 to the LSTM blocks 1f1 to 1f4 of the forward layer 1f according to the arrangement order, and an output of the LSTM block 1f4 is used as an input of the hidden layer hd. Further, the model learning unit 13 sequentially inputs the word vectors el7 to el6 from the end to the beginning of the subsequent sentence " 本日 は" of the input sentence is 1 to the LSTM blocks 1b7 to 1b6 of the backward layer 1b according to an arrangement order, and an output of the LSTM block 1b6 is used as the input of the hidden layer hd.

Thus, because learning of the punctuation mark delete model md is performed by the word string from the beginning to the end of the preceding sentence being input to the long short-term storage network in the forward direction, the sentence end immediately before the punctuation mark is learned in the punctuation mark deletion model md. On the other hand, because learning of the punctuation mark delete model md is performed by the word string from the beginning to the end of the subsequent sentence being input to the long short-term storage network in the backward direction, the sentence beginning immediately after the punctuation mark is learned in the punctuation mark deletion model md. Further, because it is not necessary to input all the word strings of the input sentence to each of the forward layer 1f and the backward layer 1b, an amount of calculation is reduced.

Figure 13:
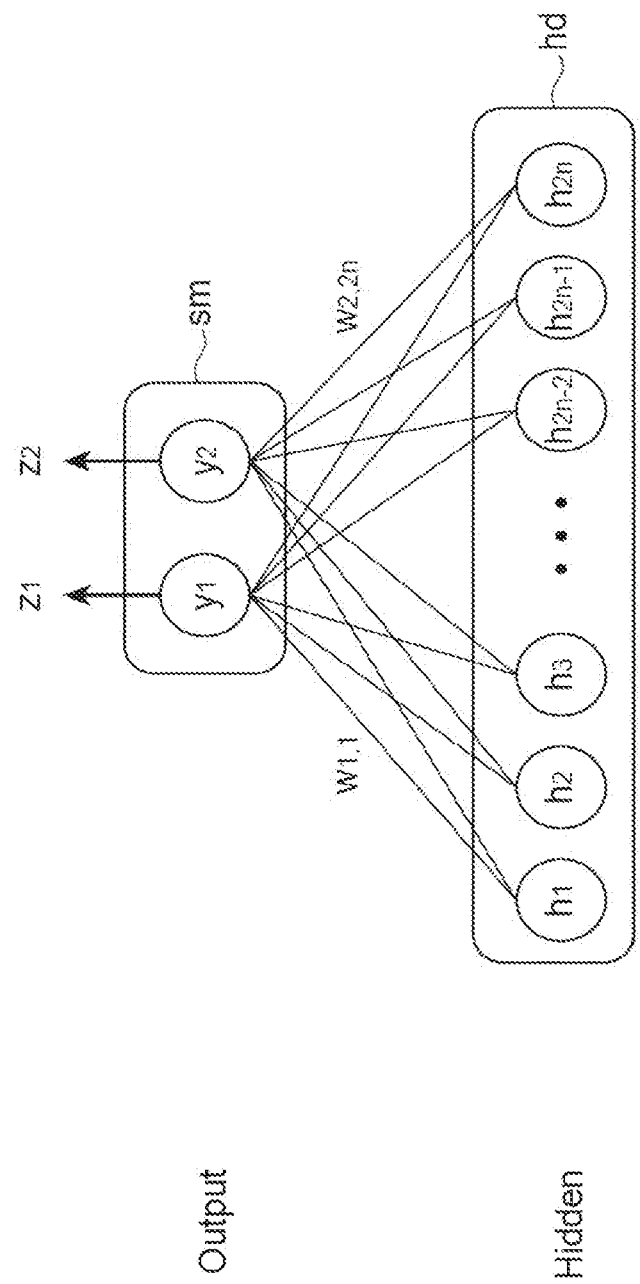
FIG. 13 is a diagram schematically illustrating a configuration of a hidden layer and an output layer of a punctuation mark delete model.

FIG. 13 is a diagram schematically illustrating a configuration of the hidden layer hd and the output layer sm of the punctuation mark delete model md. As illustrated in FIG. 13, the hidden layer hd includes an output $h_j$ of a j-th unit. The model learning unit 13 calculates an output value $z_i$ in the output layer sm on the basis of the output of the hidden layer hd using Equations (1) and (2) below.

[Math. 1]
$$y_i = \sum_{j=1}^{2n} w_{i,j} h_j + b_i \quad (1)$$

[Math. 2]
$$z_i = \frac{\exp(y_i)}{\exp(y_1) + \exp(y_2)} \quad (2)$$

In Equations (1) and (2), $w_{i,j}$ is a weights between the j-th unit in the hidden layer hd and the i-th unit in the output layer, and $b_i$ indicates a bias in the i-th unit in the output layer sm. The output layer sm may be configured by a so-called softmax function, a value of each output z in the output layer sm is a probability value that a sum is 1, $z_1$ is a probability that "a punctuation mark is to be deleted", that is, a probability that the punctuation mark is incorrect, and $z_2$ is a probability that "a punctuation mark is to be left", that is, a probability that the punctuation mark is correct.

In a learning phase of the punctuation mark delete model md, the model learning unit 13 updates the parameters of the punctuation mark delete model md on the basis of an error between probability values $z_1$ and $z_2$ output from the output layer sm and a label associated with the input sentence is 1 in the learning data. For example, the model learning unit 13 updates parameters of the long short-term storage network so that the difference between the output probability value and the label becomes small using an error back propagation method.

Therefore, when the punctuation mark delete model md is applied to a phase in which a determination is made as to whether or not a punctuation mark is deleted, a determination is made as to whether or not the punctuation mark is deleted according to one of $z_1$ and $z_2$ that has a larger probability value. For example, when $z_1 > z_2$, a determination is made that the punctuation mark should be deleted.

Thus, the learned punctuation mark delete model md learned by the parameters of the long short-term storage network being updated may be stored in the punctuation mark delete model storage unit 17. The punctuation mark delete model storage unit 17 is a storage means for storing the punctuation mark delete model md that has been learned and is being learned.

Figure 14:
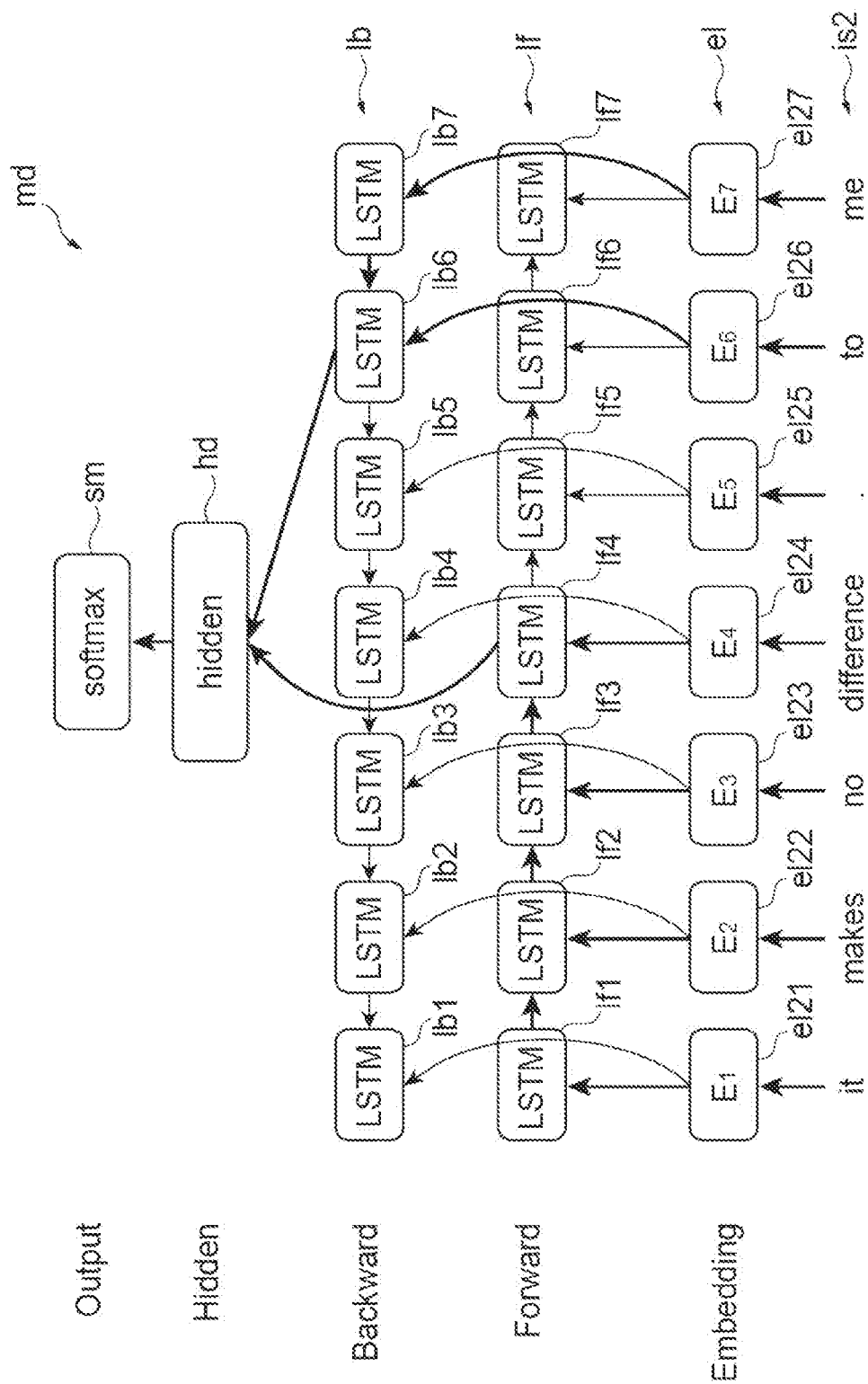
FIG. 14 is a diagram illustrating an example of learning using English learning data of a punctuation mark delete model configured of a long short-term memory network.

FIG. 14 is a diagram illustrating an example of learning using English learning data of the punctuation mark delete model configured by the bidirectional long short-term storage network of the present embodiment. As illustrated in FIG. 14, the punctuation mark delete model md includes an embedded layer el, a forward layer 1f configured of a long short-term storage network for inputting a word string of an input sentence in a forward direction, a backward layer 1b configured by a long short-term storage network for inputting the word string of the input sentence in the backward direction, a hidden layer hd, and an output layer sm. In the example illustrated in FIG. 14, an input sentence is 2 "it makes no difference . to me" is input to the punctuation mark delete model md.

First, the model learning unit 13 converts each word of the input sentence is 2 into a word vector expression in the embedded layer el, and obtains word vectors el21 to el27. Here, a method of converting a word into a vector may be, for example, a known algorithm such as word2vec or glove.

The model learning unit 13 inputs each word in the word string of the input sentence converted into a vector to each of the LSTM block 1f(n) of the forward layer 1f (n is an integer equal to or greater than 1 and corresponds to the number of words in the input sentence) and the LSTM block 1b(n) of the backward layer 1b. In the example illustrated in FIG. 14, the forward layer 1f is shown as LSTM blocks 1f1 to 1f7 developed in a forward direction in time series. Further, the backward layer 1b is shown as LSTM blocks 1b7 to 1b1 developed in a backward direction in time series.

The model learning unit 13 inputs the word vector el21 to the LSTM block 1f1 of the forward layer 1f. Then, the model learning unit 13 inputs the word vector el22 and the output of the LSTM block 1f1 to the LSTM block 1f2. The model learning unit 13 inputs the output of the LSTM block 1f(n−1) at a previous time and the word vector el(n) at a current time to the LSTM block 1f(n) at the current time to acquire an output of the LSTM block 1f(n).

Further, the model learning unit 13 inputs a word vector el27 to the LSTM block 1b7 of the backward layer 1b. Then, the model learning unit 13 inputs the word vector el26 and the output of the LSTM block 1b7 to the LSTM block 1b6. The model learning unit 13 inputs an output of the LSTM block 1b(n+1) at the previous time and the word vector el(n) at the current time to the LSTM block 1b(n) at the current time to acquire an output of the LSTM block 1b(n).

The model learning unit 13 combines an output obtained by inputting the word string of the input sentence to the forward layer 1f according to an arrangement order with an output obtained by inputting the word string of the input sentence to the backward layer 1b in an order reverse to the arrangement order to output the hidden layer hd.

As in the example illustrated in FIG. 12, the model learning unit 13 may input a word string from a beginning of a preceding sentence, which is a sentence immediately before the period, to an end of the preceding sentence to the long short-term storage network in the forward direction according to the arrangement order in the input sentence, and input a word string from an end of a subsequent sentence, which is the sentence immediately after the period, to a beginning of the subsequent sentence to the long short-term storage network in the backward direction according to an order reverse to the arrangement order in the input sentence.

That is, in the example illustrated in FIG. 14, the model learning unit 13 sequentially inputs the word vectors el21 to el24 from the beginning to the end of the preceding sentence "it makes no difference" of the input sentence is 2 to the LSTM blocks 1f1 to 1f4 of the forward layer 1f according to an arrangement order, and an output of the LSTM block 1f4 is used as the input of the hidden layer hd. Further, the model learning unit 13 sequentially inputs the word vectors el27 to el26 from the end to the beginning of the subsequent sentence "to me" of the input sentence is 2 to the LSTM blocks 1b7 to 1b6 of the backward layer 1b according to an arrangement order, and the output of the LSTM block 1b6 is used as the input of the hidden layer hd.

The model learning unit 13 calculates the output value z, in the output layer sm using Equations (1) and (2) on the basis of the output of the hidden layer obtained by combining an output obtained by inputting the word string of the input sentence to the forward layer 1f according to the arrangement order with an output obtained by inputting the word string of the input sentence to the backward layer 1b in an order reverse to the arrangement order.

The punctuation mark delete model md that is a model including a learned neural network can be regarded as a program that is read or referenced by a computer, causes the computer to execute predetermined processing, and causes the computer to realize a predetermined function.

That is, the learned punctuation mark delete model md of the present embodiment is used in a computer including a CPU and a memory. Specifically, the CPU of the computer operates to perform calculation based on a learned weighting factor(parameter) corresponding to each layer, a response function, or the like, on input data input to an input layer of the neural network according to a command from the learned punctuation mark delete model md stored in the memory, and output a result (probability) from an output layer.

Functional units of the determination device 20 will be described with reference to FIG. 2 again. The input sentence extraction unit 21 extracts, from a determination target text, a determination input sentence consisting of two consecutive sentences including a first sentence with a punctuation mark assigned at the end of the sentence and a second sentence following the first sentence. Specifically, the input sentence extraction unit 21 may acquire the determination target text from the determination target text storage unit 25. The determination target text storage unit 25 is a storage means that stores the determination target text.

The determination target text is a determination target text including one or more sentences obtained by speech recognition processing. The determination target text is, for example, a text generated on the basis of spoken voice by a speech recognition algorithm of the related art, and a punctuation mark is assigned. The punctuation mark is assigned to, for example, a silent section having a length equal to or larger than a predetermined value. Further, the punctuation mark may be assigned according to a language model that is used in a speech recognition algorithm. Therefore, the input sentence extraction unit 21 extracts the punctuation mark from the text including the punctuation mark obtained as a result of the speech recognition, extracts the sentence with the extracted punctuation mark as the first sentence, extracts the sentence following the punctuation mark as the second sentence, and extracts a determination input sentence consisting of the first sentence, the punctuation mark, and the second sentence.

The determination unit 22 inputs the determination input sentence to the punctuation mark delete model md, and determines whether the punctuation mark assigned at the end of the first sentence is correct or not. As described above, the punctuation mark delete model md outputs a probability indicating whether or not a punctuation mark in an input sentence consisting of a first sentence with the punctuation mark assigned at an end of the sentence and a second sentence following the punctuation mark is correct.

Specifically, the determination unit 22 inputs the determination input sentence to the learned punctuation mark delete model md stored in the punctuation mark delete model storage unit 17, and acquires a probability $z_1$ that the punctuation mark in the determination input sentence is incorrect and a probability $z_2$ that the punctuation mark in the determination input sentence is correct. When the probability $z_1$ is larger than the probability $z_2$, the determination unit 22 determines that the assignment of the punctuation mark in the determination input sentence is not correct. When the probability $z_1$ is smaller than the probability $z_2$, the determination unit 22 determines that the assignment of the punctuation mark in the determination input sentence is correct.

The punctuation mark correction unit 23 deletes the punctuation mark of which the assignment determined to be not correct by the determination unit 22 from the determination target text, and outputs the determination target text in which the punctuation mark has been corrected. An aspect of an output of the determination target text is not limited, and the text may be stored in a predetermined storage means or displayed on a predetermined display device.

Figure 15:
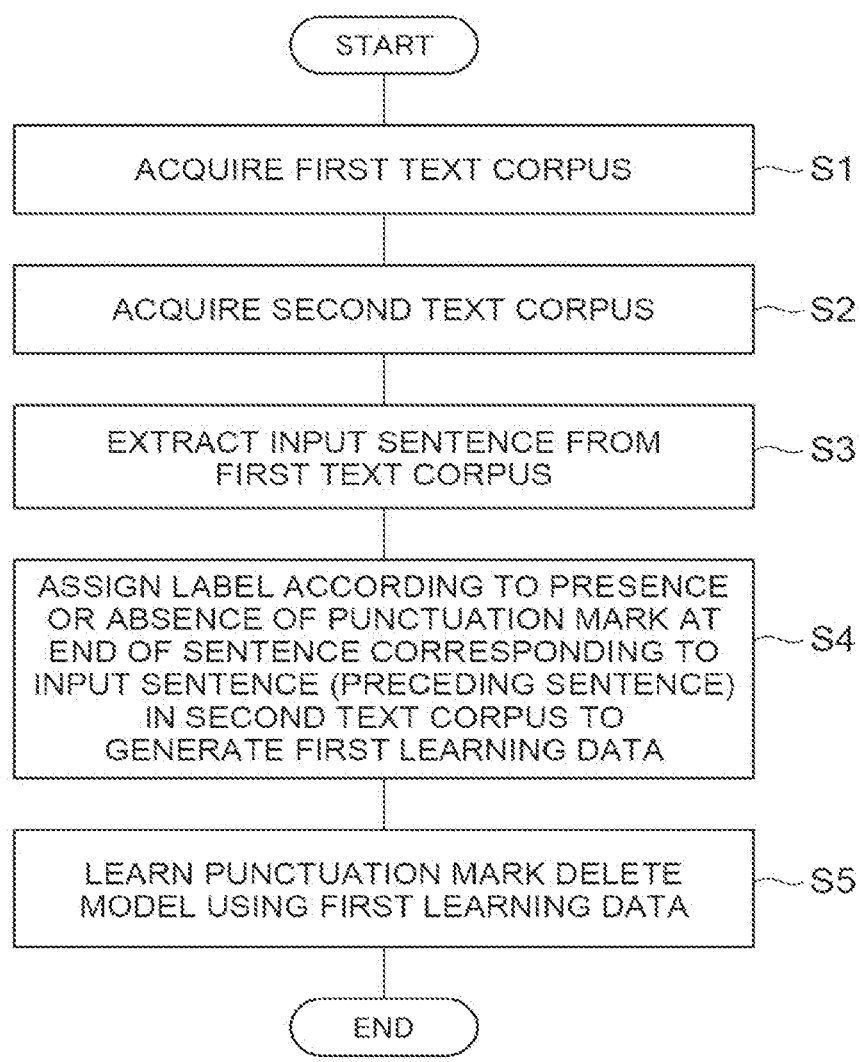
FIG. 15 is a flowchart illustrating processing content of a punctuation mark delete model learning method in the punctuation mark delete model learning device.

FIG. 15 is a flowchart illustrating processing content of a punctuation mark delete model learning method in the punctuation mark delete model learning device 10.

In step S1, the first learning data generation unit 11 acquires the first text corpus. Then, in step S2, the first learning data generation unit 11 acquires the second text corpus.

In step S3, the first learning data generation unit 11 extracts an input sentence for generation of the first learning data from the first text corpus. The input sentence consists of a preceding sentence, a punctuation mark, and a subsequent sentence.

Then, in step S4, the first learning data generation unit 11 references a part of the text in the second text corpus corresponding to the input sentence extracted from the first text corpus, and associates the input sentence with a label indicating that the punctuation mark assigned in the input sentence is correct to generate the first learning data when a punctuation mark is assigned in a part corresponding to the end of the preceding sentence of the referenced text. On the other hand, the first learning data generation unit 11 associates the input sentence with a label indicating that the punctuation mark assigned in the input sentence is incorrect to generate the first learning data when a punctuation mark is not assigned in a part corresponding to the end of the preceding sentence of the referenced text.

In step S5, the model learning unit 13 learns the punctuation mark delete model md using the first learning data. The model learning unit 13 stores the learned punctuation mark delete model md in the punctuation mark delete model storage unit 17.

Figure 16:
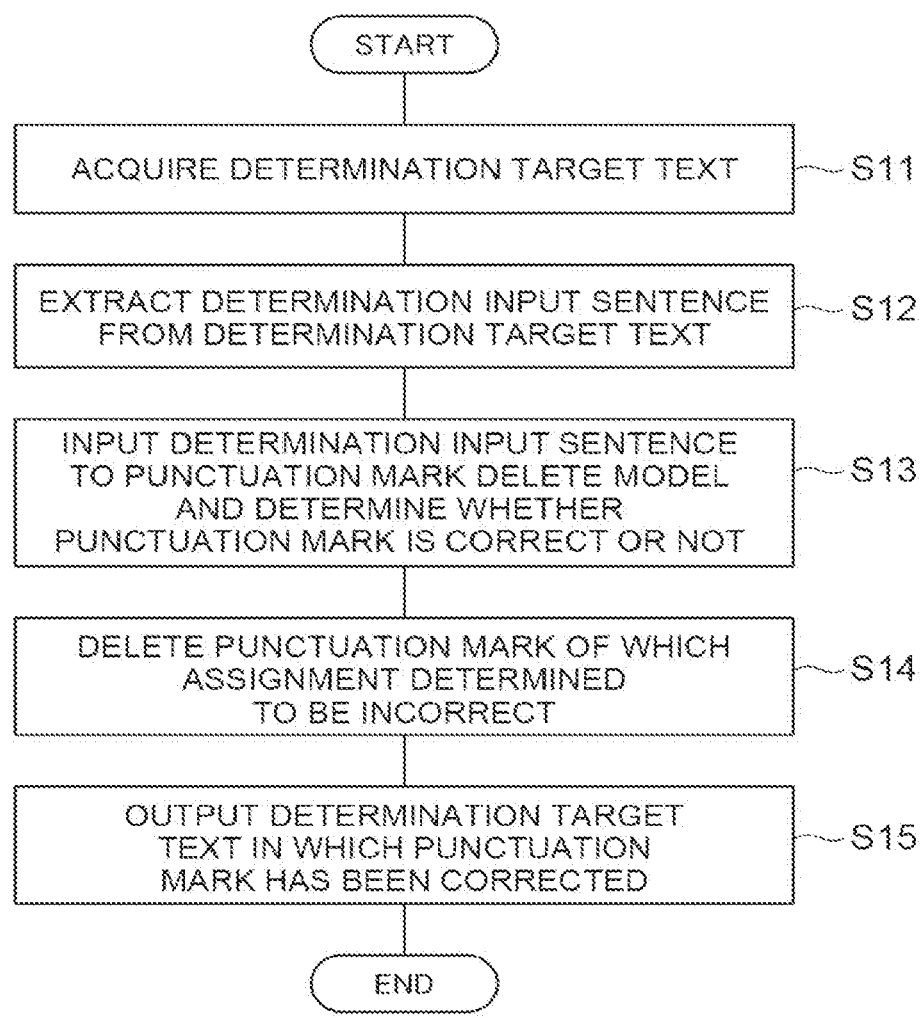
FIG. 16 is a flowchart illustrating processing content of a determination method in a determination device.

FIG. 16 is a flowchart illustrating processing content of the determination method using the learned punctuation mark delete model md in the determination device 20.

In step S11, the input sentence extraction unit 21 acquires the determination target text from, for example, the determination target text storage unit 25. In step S12, the input sentence extraction unit 21 extracts the determination input sentence from the determination target text.

In step S13, the determination unit 22 inputs the determination input sentence to the punctuation mark delete model md and determines whether or not the punctuation mark is correct.

In step S14, the punctuation mark correction unit 23 deletes the punctuation mark of which the assignment determined to be incorrect in step S13 from the determination target text.

In step S15, the punctuation mark correction unit 23 outputs a determination target text in which the punctuation mark has been corrected.

Figure 17:
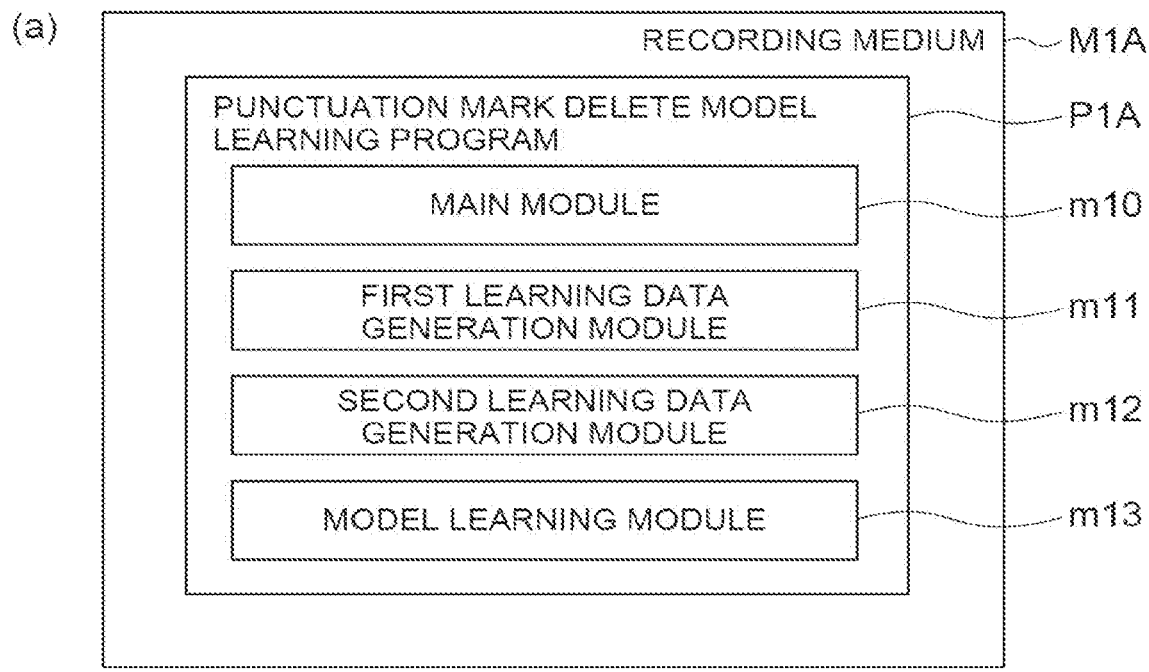
FIG. 17(*a*) is a diagram illustrating a configuration of a punctuation mark delete model learning program.
Figure 17:
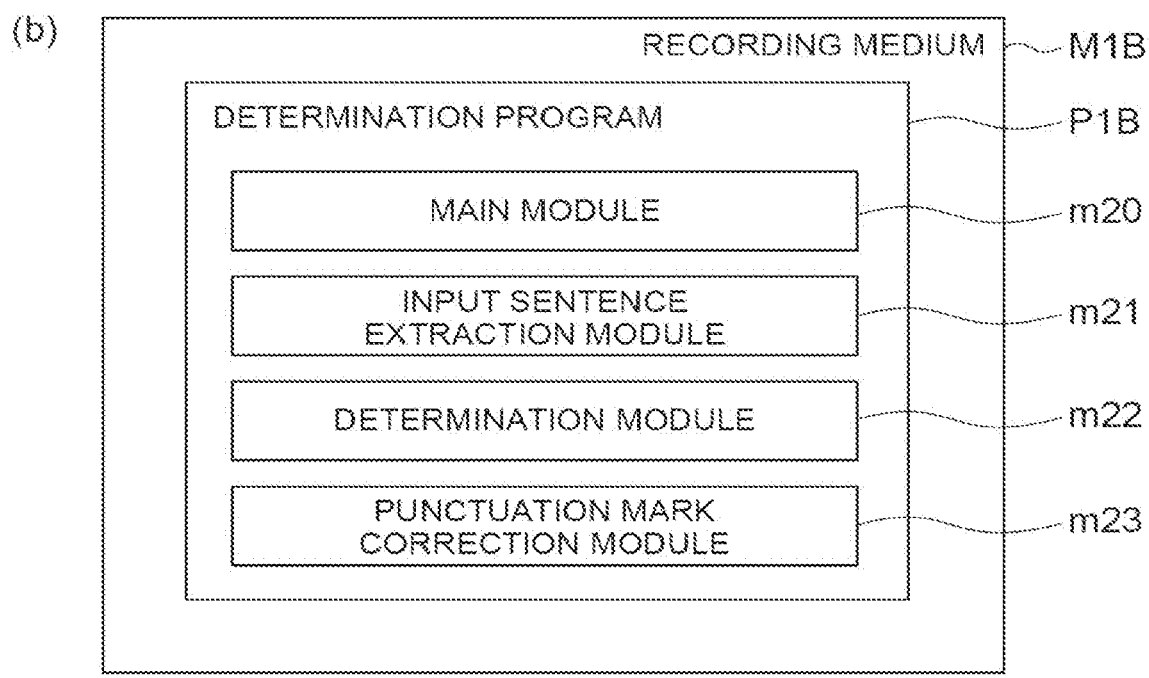

Next, a punctuation mark delete model learning program for causing a computer to function as the punctuation mark delete model learning device 10 of the present embodiment and a determination program for causing the computer to function as the determination device 20 will be described with reference to FIG. 17.

FIG. 17(a) is a diagram illustrating a configuration of a punctuation mark delete model learning program. A punctuation mark delete model learning program P1A comprises a main module m10, a first learning data generation module m11, a second learning data generation module m12, and a model learning module m13 that collectively control punctuation mark delete model learning processing in the punctuation mark delete model learning device 10. Respective functions for the first learning data generation unit 11, the second learning data generation unit 12, and the model learning unit 13 are realized by the respective modules m11 to m13.

The punctuation mark delete model learning program P1A may be transmitted via a transmission medium such as a communication line, in an aspect or may be stored in a recording medium M1A as illustrated in FIG. 17(a) in an aspect.

FIG. 17(b) is a diagram illustrating a configuration of the determination program. The determination program P1B comprises a main module m20, an input sentence extraction module m21, a determination module m22, and a punctuation mark correction module m23 that comprehensively control determination processing in the determination device 20. The respective functions for the input sentence extraction unit 21, the determination unit 22, and the punctuation mark correction unit 23 are realized by the respective modules m21 to m23.

The determination program P1B may be transmitted via a transmission medium such as a communication line in an aspect, or may be stored in a recording medium M1B as illustrated in FIG. 17(b) in an aspect.

According to the punctuation mark delete model learning device 10, the punctuation mark delete model learning method, the punctuation mark delete model md, and the punctuation mark delete model learning program HA of the present embodiment described above, because the two sentences consisting of the preceding sentence immediately before the punctuation mark inserted on the basis of the information obtained by the speech recognition processing and the subsequent sentence immediately after the punctuation mark are used as the input sentences in the first learning data, and learning of the punctuation mark delete model is performed, information obtained from a voice is reflected in the punctuation mark delete model. Further, because in the first learning data, the label indicating whether or not the punctuation mark included in the input sentence is corrected is associated with each input sentence, and learning of the punctuation mark delete model is performed on the basis of the error between the probability obtained by inputting the input sentence to the punctuation mark delete model and the label, information on the punctuation mark assigned without error is reflected in the punctuation mark delete model. Therefore, it becomes possible to obtain a punctuation mark delete model capable of correctly deleting a punctuation mark erroneously assigned in the text obtained by the speech recognition processing.

Further, in the punctuation mark delete model learning device according to another form, the first learning data generation unit assigns the label of the first learning data on the basis of the presence or absence of a punctuation mark at an end of a sentence corresponding to the preceding sentence included in the input sentence in a second text corpus, the second text corpus being text consisting of the same text as each first text corpus and having a punctuation mark assigned at the end of the sentence included in the text.

According to the above embodiment, the label associated with the input sentence extracted from the first text corpus is acquired on the basis of a comparison with the second text corpus that is the same text as the first text corpus and has a punctuation mark assigned at the end of each sentence. Because the second text corpus is text with a punctuation mark correctly assigned at the end of the sentence, the first learning data with an appropriate label is generated.

Further, in the punctuation mark delete model learning device according to the other form, the first text corpus is text with a punctuation mark inserted at an end of each voice section divided by a silent section having a predetermined length or longer.

According to the above embodiment, because the first learning data is generated on the basis of the first text corpus, which is text in which a punctuation mark is inserted into a silent section in a result of speech recognition, the first learning data in which information obtained by speech recognition processing has been reflected can be generated.

Further, the punctuation mark delete model learning device according to another form further comprises a second learning data generation unit that generates second learning data consisting of a pair of an input sentence including a preceding sentence with a punctuation mark assigned at an end of the sentence and a subsequent sentence following the punctuation mark in the text constituting the fourth text corpus, and a label indicating whether or not the assignment of the punctuation mark is correct, on the basis of a third text corpus consisting of text including a sentence with a punctuation mark legitimately assigned at an end of the sentence, and a fourth text corpus consisting of text obtained by randomly inserting a punctuation mark into the text constituting the third text corpus, the label of the second learning data being assigned on the basis of presence or absence of a punctuation mark at an end of the sentence corresponding to the preceding sentence included in the input sentence of the second learning data in the third text corpus, and the model learning unit updates the parameters of the punctuation mark delete model on the basis of the error between the probability obtained by inputting input sentences of the first learning data and the second learning data to the punctuation mark delete model and the label associated with the input sentence.

For the generation of the first learning data, text having an appropriately assigned punctuation mark, which corresponds to the first text corpus, is required in order to associate the input sentence with an appropriate label, and the second text corpus, for example, is applied to this text. Because the second text corpus is, for example, manually input and generated text, it takes time and effort to obtain a large number of second text corpuses. According to the above embodiment, because the second learning data is generated on the basis of the third text corpus with a legitimately assigned punctuation mark and the fourth text corpus consisting of text obtained by randomly inserting a punctuation mark into the text constituting the third text corpus, and the second learning data can be used for learning of the punctuation mark delete model together with the first learning data, it becomes possible to supplement an amount of learning data to be used for model generation, and as a result, to obtain a high-accuracy punctuation mark delete model.

Further, in the punctuation mark delete model learning device according to another embodiment, the punctuation mark delete model comprises a bidirectional long short-term storage network including respective long short-term storage networks in the forward direction and the backward direction, and the model learning unit inputs a word string included in the preceding sentence and a word string included in the subsequent sentence to the long short-term storage network in the forward direction according to an arrangement order in the input sentence from the word at the beginning of the preceding sentence, inputs the word string included in the preceding sentence and the word string included in the subsequent sentence to the long short-term storage network in the backward direction in an order reverse to the arrangement order in the input sentence from the word at the end of the subsequent sentence, and acquires the probability on the basis of the output of the long short-term storage network in the forward direction and the output of the long short-term storage network in the backward direction.

According to the above embodiment, the tendency of a place in which a punctuation mark is assigned is learned in the punctuation mark delete model together with the tendency in forward and backward directions of the word strings of the preceding sentence immediately before the punctuation mark and the subsequent sentence following the punctuation mark. Therefore, a punctuation mark delete model capable of determining the necessity of punctuation mark deletion with high accuracy can be obtained.

Further, in the punctuation mark delete model learning device according to another form, the model learning unit inputs a word string from a beginning of the preceding sentence to an end of the preceding sentence to the long short-term storage network in the forward direction according to an arrangement order in the input sentence, and inputs a word string from an end of the subsequent sentence to a beginning of the subsequent sentence to the long short-term storage network in a backward direction according to an order reverse to the arrangement order in the input sentence.

According to the above embodiment, because learning of the punctuation mark delete model is performed by the word string from the beginning to the end of the preceding sentence being input to the long short-term storage network in the forward direction, the sentence end immediately before the punctuation mark is learned in the punctuation mark deletion model. On the other hand, because learning of the punctuation mark delete model and is performed by the word string from the end to the beginning of the subsequent sentence being input to the long short-term storage network in the backward direction, the sentence beginning immediately after the punctuation mark is learned in the punctuation mark deletion model.

In order to solve the above problem, a punctuation mark delete model according to an embodiment of the present invention is a model for determining whether or not a punctuation mark assigned to text obtained by speech recognition processing is correct, the punctuation mark delete model being learned by machine learning by causing a computer to function, wherein the punctuation mark delete model is constructed by machine learning for receiving two consecutive sentences of a first sentence with a punctuation mark assigned at an end of the sentence and a second sentence following the first sentence, and outputting a probability indicating whether the punctuation mark assigned at an end of the first sentence is correct, setting a pair of an input sentence including a preceding sentence, the preceding sentence being a sentence with a punctuation mark assigned at an end of the sentence, and a subsequent sentence, the subsequent sentence being a sentence following the punctuation mark in text constituting the first text corpus, and a label indicating whether or not the assignment of the punctuation mark is correct, as first learning data, on the basis of a first text corpus, the first text corpus being text including of one or more sentences obtained by speech recognition processing and having a punctuation mark assigned thereto on the basis of information obtained by speech recognition processing, and updating parameters of the punctuation mark delete model on the basis of an error between the probability output by inputting the input sentences included in the first learning data to the punctuation mark delete model and the label associated with the input sentence.

In order to solve the above problem, a determination device according to an embodiment of the present invention is a determination device for determining whether or not a punctuation mark assigned to text obtained by speech recognition processing is correct, the determination device including: an input sentence extraction unit configured to extract a determination input sentence consisting of two consecutive sentences including a first sentence with a punctuation mark assigned at an end of the sentence and a second sentence following the first sentence from determination target text, the determination target text being text serving as a determination target including one or more sentences obtained by speech recognition processing, a determination unit configured to input the determination input sentence to a punctuation mark delete model and determine whether or not the punctuation mark assigned at the end of the sentence of the first sentence is correct; and a punctuation mark correction unit configured to delete the punctuation mark determined to be incorrect by the determination unit from the determination target text and output the determination target text with the corrected punctuation mark, wherein the punctuation mark delete model is a model learned by machine learning for causing a computer to function, and is constructed by machine learning for receiving two consecutive sentences of a first sentence with a punctuation mark assigned at an end of the sentence and a second sentence following the first sentence, and outputting a probability indicating whether the punctuation mark assigned at an end of the first sentence is correct, setting a pair of an input sentence including a preceding sentence, the preceding sentence being a sentence with a punctuation mark assigned at an end of the sentence, and a subsequent sentence, the subsequent sentence being a sentence following the punctuation mark in text constituting the first text corpus, and a label indicating whether or not the assignment of the punctuation mark is correct, as first learning data, on the basis of a first text corpus, the first text corpus being text including of one or more sentences obtained by speech recognition processing and having a punctuation mark assigned thereto on the basis of information obtained by speech recognition processing; and updating parameters of the punctuation mark delete model on the basis of an error between the probability output by inputting the input sentences included in the first learning data to the punctuation mark delete model and the label associated with the input sentence.

According to the above embodiment, using the first learning data consisting of the two sentences consisting of the preceding sentence immediately before the punctuation mark inserted on the basis of the information obtained by the speech recognition processing and the subsequent sentence following the punctuation mark as input sentences, and the label indicating whether or not the punctuation mark included in the input sentence is correct, the punctuation mark delete model learned on the basis of the error between the probability obtained by inputting the input sentence into the punctuation mark delete model and the label is obtained. Therefore, it becomes possible to obtain a punctuation mark delete model capable of correctly deleting a punctuation mark erroneously assigned in the text obtained by the speech recognition processing. In the determination device, the punctuation mark delete model obtained in this way can be used to appropriately delete the punctuation mark from the determination target text.

Although the present embodiment has been described in detail above, it is apparent to those skilled in the art that the present embodiment is not limited to the embodiments described in the present specification. The present embodiment can be implemented as a modified and changed aspect without departing from the spirit and scope of the present invention defined by the description of the claims. Accordingly, the description of the present specification is intended for the purpose of illustration and does not have any restrictive meaning with respect to the present embodiments.

Each aspect or embodiment described in the present specification may be applied to long term evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broad-band (UMB), IEEE 802.11 (Wi-Fi), IEEE 802.16 (WiMAX), IEEE 802.20, Ultra-WideBand (UWB), Bluetooth (registered trademark), another system using an appropriate system, and/or a next generation system extended on the basis of these.

A process procedure, a sequence, a flowchart, and the like in each aspect/embodiment described in the present specification may be in a different order unless inconsistency arises. For example, for the method described in the present specification, elements of various steps are presented in an exemplary order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present specification may be used alone, may be used in combination, or may be used by being switched according to the execution. Further, a notification of predetermined information (for example, a notification of "being X") is not limited to being made explicitly, and may be made implicitly (for example, a notification of the predetermined information is not made).

Although the present disclosure has been described above in detail, it is obvious to those skilled in the art that the present disclosure is not limited to the embodiments described in the present disclosure. The present disclosure can be implemented as modified and changed aspects without departing from the spirit and scope of the present disclosure defined by the description of the claims Therefore, the description of the present disclosure is intended for exemplification, and does not have any restrictive meaning with respect to the present disclosure.

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless of whether the software may be called software, firmware, middleware, microcode, or hardware description language or called another name.

Further, software, instructions, and the like may be transmitted and received via a transmission medium. For example, when software is transmitted from a website, a server, or another remote source using a wired technology such as a coaxial cable, an optical fiber cable, a twisted pair, or a digital subscriber line (DSL) and a wireless technology such as infrared rays, no cable, or microwaves, the wired technology and the wireless technology is included in a definition of the transmission medium.

The information, signals, and the like described in the present disclosure may be represented using any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or any combination of these.

The terms described in the present disclosure and/or terms necessary for understanding of the present specification may be replaced by terms having the same or similar meanings.

The terms "system" and "network" used in the present specification are used interchangeably.

Further, the information, parameters, and the like described in the present specification may be represented by an absolute value, may be represented by a relative value from a predetermined value, or may be represented by other corresponding information.

The term "determining" used in the present disclosure may include a variety of operations. The "determining" can include, for example, regarding judging, calculating, computing, processing, deriving, investigating, looking up (search or inquiry; for example, looking up in a table, a database, or another data structure), or ascertaining as "determining". Further, "determining" can include regarding receiving (for example, receiving information), transmitting (for example, transmitting information), inputting, outputting, or accessing (for example, accessing data in a memory) as "determining". Further, "determining" can include regarding resolving, selecting, choosing, establishing, comparing, or the like as "determining". That is, "determining" can include regarding a certain operation as "determining". Further, "determination" may be read as "assuming", "expecting", "considering", or the like.

The description "based on" used in the present specification does not mean "based only on" unless otherwise noted. In other words, the description "based on" means both of "based only on" and "at least based on".

When the terms "first", "second", and the like are used in the present specification, any reference to elements thereof does not generally limit an amount or order of those elements. These terms can be used in the present specification as a convenient way to distinguish between two or more elements. Thus, the reference to the first and second elements does not mean that only two elements can be adopted or that the first element has to precede the second element in some way.

When "include", "including" and modifications thereof are used in the present specification or claims, those terms are intended to be comprehensive like the term "comprising". Further, the term "or" used in the present specification or claims is intended not to be an exclusive OR.

In the present specification, it is assumed that a plurality of devices are also included unless a single device is clearly indicated by the context or technically.

In the whole of the present disclosure, it is assumed that a plurality of things are included unless it is cleared from the context that a singular thing is indicated.

REFERENCE SIGNS LIST

10 Punctuation mark delete model learning device
11 First learning data generation unit
12 Second learning data generation unit
13 Model learning unit
15 First/second text corpus storage unit
16 Third/fourth text corpus storage unit
17 Punctuation mark delete model storage unit
20 Determination device
21 Input sentence extraction unit
22 Determination unit
23 Punctuation mark correction unit
25 Determination target text storage unit
m10 Main module
m11 First learning data generation module
m12 Second learning data generation module
m13 Model learning module
M1A, M1B Recording medium
m20 Main module
m21 Input sentence extraction module
m22 Determination module
m23 Punctuation mark correction module
md Punctuation mark delete model
P1A Punctuation mark delete model learning program
P1B Determination program

The invention claimed is:

1. A punctuation mark delete model learning device for generating, through machine learning, a punctuation mark delete model for determining whether or not a punctuation mark assigned to text obtained by speech recognition processing is correct,
wherein the punctuation mark delete model receives two consecutive sentences of a first sentence with a punctuation mark assigned at an end of the sentence and a second sentence following the first sentence, and outputs a probability indicating whether the punctuation mark assigned at an end of the first sentence is correct, and
the punctuation mark delete model learning device comprises circuitry configured to:
generate first learning data consisting of a pair of an input sentence including a preceding sentence, the preceding sentence being a sentence with a punctuation mark assigned at an end of the sentence, and a subsequent sentence, the subsequent sentence being a sentence following the punctuation mark in text constituting a first text corpus, and a label indicating whether or not the assignment of the punctuation mark is correct on the basis of the first text corpus, the first text corpus being text including of one or more sentences obtained by speech recognition processing and having a punctuation mark assigned thereto on the basis of information obtained by speech recognition processing; and
update parameters of the punctuation mark delete model on the basis of an error between the probability obtained by inputting the input sentences of the first learning data to the punctuation mark delete model and the label associated with the input sentence.

2. The punctuation mark delete model learning device according to claim 1, wherein the circuitry assigns the label of the first learning data on the basis of the presence or absence of a punctuation mark at an end of a sentence corresponding to preceding sentence included in the input sentence in a second text corpus, the second text corpus being text consisting of the same text as each first text corpus and having a punctuation mark assigned at the end of the sentence included in the text.

3. The punctuation mark delete model learning device according to claim 2, wherein the first text corpus is text with a punctuation mark inserted at an end of each voice section divided by a silent section having a predetermined length or longer.

4. The punctuation mark delete model learning device according to claim 1, wherein the first text corpus is text with a punctuation mark inserted at an end of each voice section divided by a silent section having a predetermined length or longer.

5. The punctuation mark delete model learning device according to claim 1, wherein the circuitry is further configured to generate second learning data consisting of a pair of an input sentence including a preceding sentence with a punctuation mark assigned at an end of the sentence and a subsequent sentence following the punctuation mark in the text constituting a fourth text corpus, and a label indicating whether or not the assignment of the punctuation mark is correct, on the basis of a third text corpus consisting of text including a sentence with a punctuation mark legitimately assigned at an end of the sentence, and the fourth text corpus consisting of text obtained by randomly inserting a punctuation mark into the text constituting the third text corpus, the label of the second learning data being assigned on the basis of presence or absence of a punctuation mark at an end of the sentence corresponding to the preceding sentence included in the input sentence of the second learning data in the third text corpus, and wherein the circuitry updates the parameters of the punctuation mark delete model on the basis of the error between the probability obtained by inputting the input sentences of the first learning data and the second learning data to the punctuation mark delete model and the label associated with the input sentence.

6. The punctuation mark delete model learning device according to claim 1, wherein the punctuation mark delete model comprises a bidirectional long short-term storage network including respective forward and backward long short-term storage networks, and wherein the circuitry inputs a word string included in the preceding sentence and a word string included in the subsequent sentence to the long short-term storage network in the forward direction according to an arrangement order in the input sentence from the word at the beginning of the preceding sentence, inputs the word string included in the preceding sentence and the word string included in the subsequent sentence to the long short-term storage network in the backward direction in an order reverse to the arrangement order in the input sentence from the word at the end of the subsequent sentence, and acquires the probability on the basis of the output of the long short-term storage network in the forward direction and the output of the long short-term storage network in the backward direction.

7. The punctuation mark delete model learning device according to claim 6, wherein the punctuation mark delete model comprises a hidden layer configured to combine an output of the long short-term storage network in the forward direction with an output of the long short-term storage network in the backward direction; and an output layer configured to generate the probability on the basis of an output of the hidden layer.

8. The punctuation mark delete model learning device according to claim 7, wherein the model learning unit circuitry inputs a word string from a beginning of the preceding sentence to an end of the preceding sentence to the long short-term storage network in the forward direction according to an arrangement order in the input sentence, and inputs a word string from an end of the subsequent sentence to a beginning of the subsequent sentence to the long short-term storage network in the backward direction according to an order reverse to the arrangement order in the input sentence.

9. A determination device for determining whether or not a punctuation mark assigned to text obtained by speech recognition processing is correct, the determination device comprising circuitry configured to:

extract a determination input sentence consisting of two consecutive sentences including a first sentence with a punctuation mark assigned at an end of the sentence and a second sentence following the first sentence from determination target text, the determination target text being text serving as a determination target including one or more sentences obtained by speech recognition processing, input the determination input sentence to a punctuation mark delete model and determine whether or not the punctuation mark assigned at the end of the sentence of the first sentence is correct; and delete the punctuation mark determined to be incorrect by the circuitry from the determination target text and output the determination target text with the corrected punctuation mark, wherein the punctuation mark delete model is a model learned by machine learning for causing a computer to function, and is constructed by machine learning for receiving two consecutive sentences of a first sentence with a punctuation mark assigned at an end of the sentence and a second sentence following the first sentence, and outputting a probability indicating whether the punctuation mark assigned at an end of the first sentence is correct, setting a pair of an input sentence including a preceding sentence, the preceding sentence being a sentence with a punctuation mark assigned at an end of the sentence, and a subsequent sentence, the subsequent sentence being a sentence following the punctuation mark in text constituting a first text corpus, and a label indicating whether or not the assignment of the punctuation mark is correct, as first learning data, on the basis of the first text corpus, the first text corpus being text including of one or more sentences obtained by speech recognition processing and having a punctuation mark assigned thereto on the basis of information obtained by speech recognition processing; and updating parameters of the punctuation mark delete model on the basis of an error between the probability output by inputting the input sentences included in the first learning data to the punctuation mark delete model and the label associated with the input sentence.

* * * * *